US011451028B2

(12) United States Patent
Smith

(10) Patent No.: US 11,451,028 B2
(45) Date of Patent: Sep. 20, 2022

(54) CONDUIT NIPPLE GROUNDING BUSHING

(71) Applicant: Bridgeport Fittings, LLC, Stratford, CT (US)

(72) Inventor: Lawrence J. Smith, Stamford, CT (US)

(73) Assignee: Bridgeport Fittings, LLC, Stratford, CT (US)

( * ) Notice: Subject to any disclaimer, the term of this patent is extended or adjusted under 35 U.S.C. 154(b) by 331 days.

(21) Appl. No.: 16/826,650

(22) Filed: Mar. 23, 2020

(65) Prior Publication Data

US 2021/0296869 A1    Sep. 23, 2021

(51) Int. Cl.
| | |
|---|---|
| *H02G 3/00* | (2006.01) |
| *H02G 3/06* | (2006.01) |
| *H02G 3/08* | (2006.01) |
| *H01R 4/30* | (2006.01) |
| *H01B 17/56* | (2006.01) |
| *H01R 4/26* | (2006.01) |

(52) U.S. Cl.
CPC .......... *H02G 3/0616* (2013.01); *H01B 17/56* (2013.01); *H01R 4/308* (2013.01); *H02G 3/086* (2013.01); *H01R 4/26* (2013.01); *H02G 3/085* (2013.01)

(58) Field of Classification Search
CPC ...... H02G 3/0616; H02G 3/086; H02G 3/085; H01B 17/56; H01R 4/308; H01R 4/26
See application file for complete search history.

(56) References Cited

U.S. PATENT DOCUMENTS

| | | | | |
|---|---|---|---|---|
| 5,713,763 | A  * | 2/1998  | Schwarz | H02G 3/0666 |
| | | | | 439/607.41 |
| 9,705,256 | B1* | 7/2017  | Smith | H01R 4/56 |
| 10,027,039 | B1* | 7/2018  | Smith | H01R 4/366 |
| 10,431,970 | B1* | 10/2019 | Gretz | H02G 3/083 |
| 2011/0287643 | A1* | 11/2011 | Lopez | H02G 3/0616 |
| | | | | 439/100 |
| 2018/0006420 | A1* | 1/2018  | Urtz, Jr. | H01R 24/525 |

* cited by examiner

*Primary Examiner* — Pete T Lee
(74) *Attorney, Agent, or Firm* — Ware, Fressola, Maguire & Barber LLP

(57) ABSTRACT

A conduit nipple grounding bushing to connect between two electrical enclosures or an electrical enclosure and a conduit body, comprising a body having a first portion and a second portion forming a hollow cylindrical interior for the passage of conductors therethrough, the body having a first opening at a first end of the body and a second opening at a second end of the body, the first portion having an outer surface with one or more mounting pads along a circumferential area, each of said one or more mounting pads configured for receipt of a grounding lug, and an end surface dimensioned to contact an electrical box about a knockout hole thereof, and wherein the second portion has exterior threads configured to pass through a knockout hole of an electrical box and dimensioned for receipt of a locknut if the conduit nipple grounding bushing is connected between two electrical boxes or for threaded engagement with a threaded hub of a conduit body if the conduit nipple grounding bushing is connected between an electrical box and a conduit body; and a grounding lug dimensioned for securement to one of the mounting pads by a screw, wherein the mounting pad includes a threaded bore for receipt of said screw.

9 Claims, 10 Drawing Sheets

CONDUIT NIPPLE GROUNDING BUSHING

FIELD OF THE INVENTION

The present invention relates to electrical fittings, in particular a conduit nipple grounding bushing.

BACKGROUND OF THE INVENTION

Conduit nipples are known in the art and can be used as a short raceway between electrical enclosures (electrical panel boxes) or between an electrical enclosure and a conduit body and can also be used in association with conduit connectors.

There is a need for a conduit nipple that is grounded and which can be used to be connected between two electrical enclosures or between an electrical enclosure and a conduit body. There is also a need to provide such an improved conduit nipple that can be insulated at either end to minimize electrical conductor chaffing for conductors passing therethrough.

SUMMARY OF THE INVENTION

The present invention relates to a conduit nipple grounding bushing to connect between two electrical enclosures or an electrical enclosure and a conduit body, comprising a body having a first portion and a second portion forming a hollow cylindrical interior for the passage of conductors therethrough, the body having a first opening at a first end of the body and a second opening at a second end of the body, the first portion having an outer surface with one or more mounting pads along a circumferential area, each of said one or more mounting pads configured for receipt of a grounding lug, and an end surface dimensioned to contact an electrical box about a knockout hole thereof, and wherein the second portion has exterior threads configured to pass through a knockout hole of an electrical box and dimensioned for receipt of a locknut if the conduit nipple grounding bushing is connected between two electrical boxes or for threaded engagement with a threaded hub of a conduit body if the conduit nipple grounding bushing is connected between an electrical box and a conduit body; and a grounding lug dimensioned for securement to one of the mounting pads by a screw, wherein the mounting pad includes a threaded bore for receipt of said screw.

Another embodiment of the present invention is the conduit nipple grounding bushing as described above, further comprising a snap-on insulator, the snap-on insulator comprising an end face located on a first side, the end face having an inner periphery and an outer periphery, a substantially cylindrical member joined to the outer periphery of the end face, the cylindrical member having one or more cutouts formed therein, each cutout dimensioned to be positioned adjacent with one mounting pad of the first portion of the body, a generally cylindrical sleeve extending from the inner periphery of the end face, the snap-on insulator thus configured to cover the first end of the body when connected thereto.

A further embodiment of the present invention is the conduit nipple grounding bushing as described above, wherein the first portion of the body has a plurality of protrusions spaced apart from the one or more mounting pads, said one or more protrusions extending radially, and wherein the snap-on insulator cylindrical member has openings formed therein configured to receive one of the protrusions of the first portion of the body.

A further embodiment of the present invention is the conduit nipple grounding bushing as described above, further comprising an insuliner, cylindrical in shape and dimensioned for press-fit insertion into the second opening at the second end of the body.

A further embodiment of the present invention is the conduit nipple grounding bushing as described above, wherein the insuliner has a radially extending rim at one end dimensioned to contact the second end of the body while not interfering with securement of a locknut to the exterior threads on the second portion of the body.

A further embodiment of the present invention is the conduit nipple grounding bushing as described above, wherein the snap-on insulator and the insuliner are fabricated from plastic.

A further embodiment of the present invention is the conduit nipple grounding bushing as described above, wherein the body is formed from zinc alloy.

A further embodiment of the present invention is the conduit nipple grounding bushing as described above, wherein the end surface of the first portion of the body includes serrations extending toward the second portion of the body so as to reduce vibrations between the conduit nipple grounding bushing and an electrical enclosure and to facilitate electrical and mechanical bonding to the electrical enclosure.

A further embodiment of the present invention is the conduit nipple grounding bushing as described above, further comprising an insuliner, cylindrical in shape and dimensioned for press-fit insertion into the second opening at the second end of the body.

A further embodiment of the present invention is the conduit nipple grounding bushing as described above, wherein the insuliner has a radially extending rim at one end dimensioned to contact the second end of the body while not interfering with securement of a locknut to the exterior threads on the second portion of the body.

A further embodiment of the present invention is the conduit nipple grounding bushing as described above, wherein the snap-on insulator and the insuliner are fabricated from plastic.

A further embodiment of the present invention is the conduit nipple grounding bushing as described above, wherein the body is formed from zinc alloy.

A further embodiment of the present invention is the conduit nipple grounding bushing as described above, wherein the grounding lug includes serrations for bonding the grounding lug to one of the mounting pads.

A further embodiment of the present invention is the conduit nipple grounding bushing as described above, wherein the end surface of the first portion of the body includes serrations extending toward the second portion of the body so as to reduce vibrations between the conduit nipple grounding bushing and an electrical enclosure and to facilitate electrical and mechanical bonding to the electrical enclosure.

BRIEF DESCRIPTION OF THE DRAWINGS

For a fuller understanding of the nature and objects of the present invention, reference is made to the following detailed description taken in conjunction with the following drawings in which.

DETAILED DESCRIPTION

Figure 1:
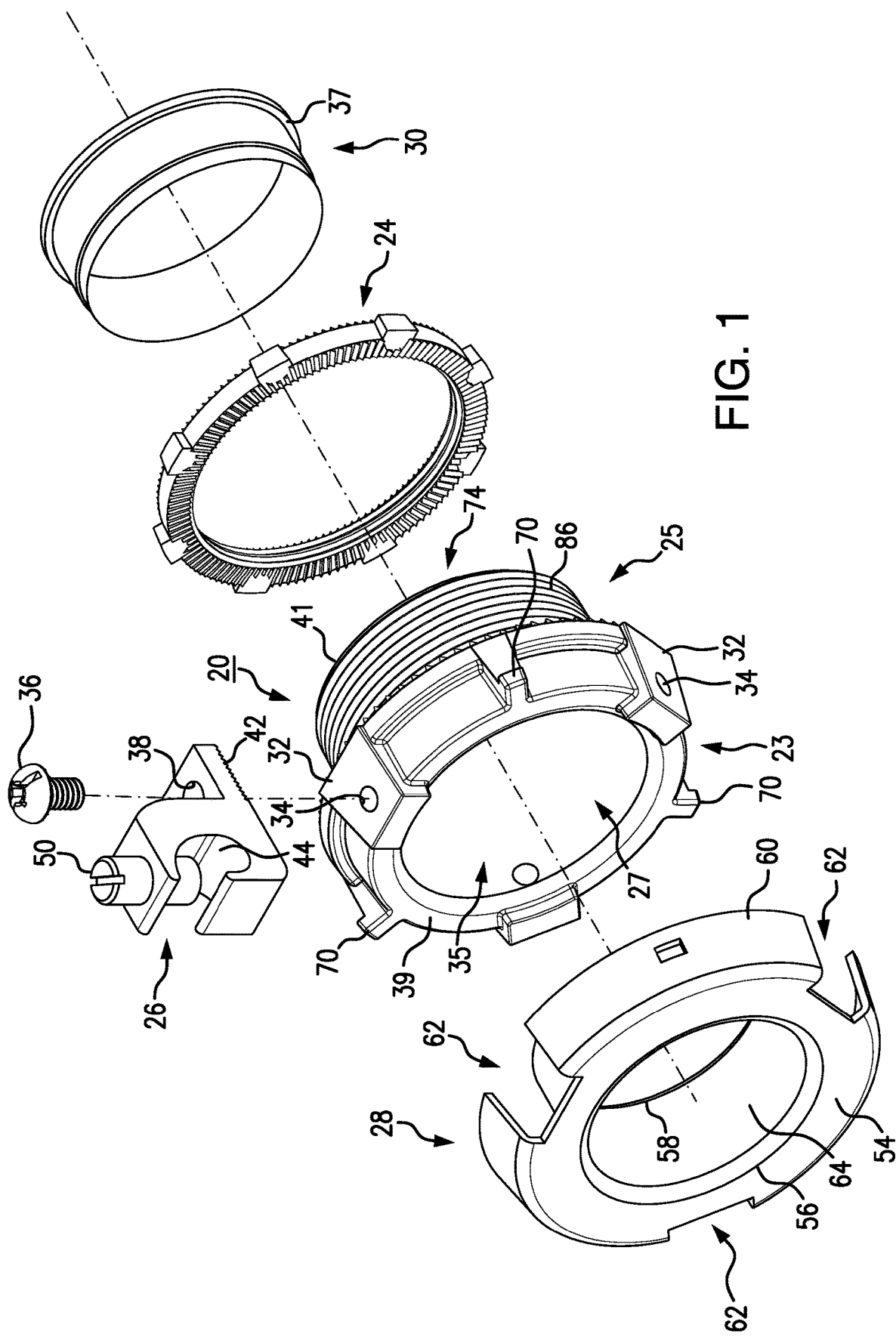
FIG. 1 is an exploded perspective view of a conduit nipple grounding bushing according to an embodiment of the present invention.
Figure 2:
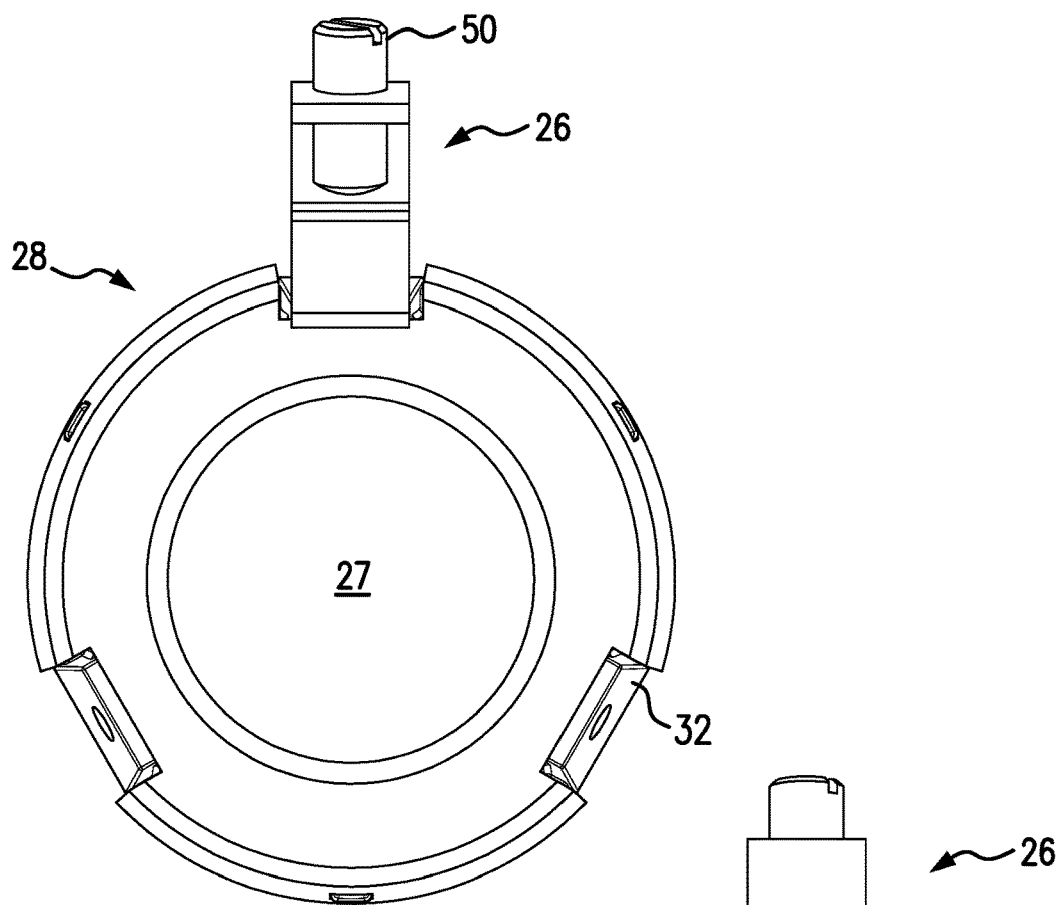
FIG. 2 is a top view of the conduit nipple grounding bushing showing a snap-on insulator attached to the body of the conduit nipple grounding bushing.
Figure 6:
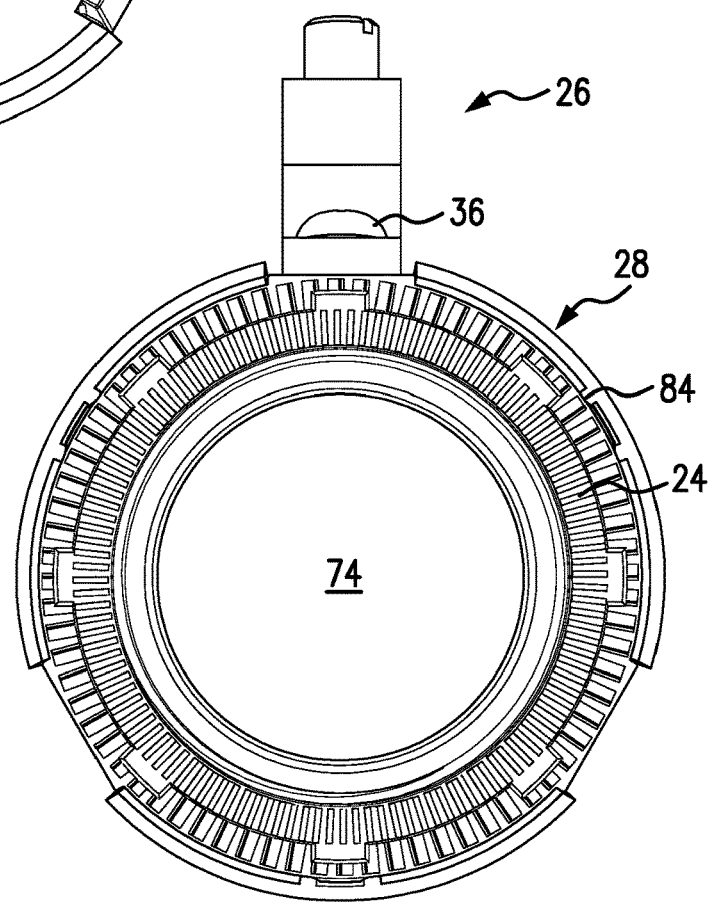
FIG. 6 is a rear view of the grounding bushing relative to FIG. 1.
Figure 3A:
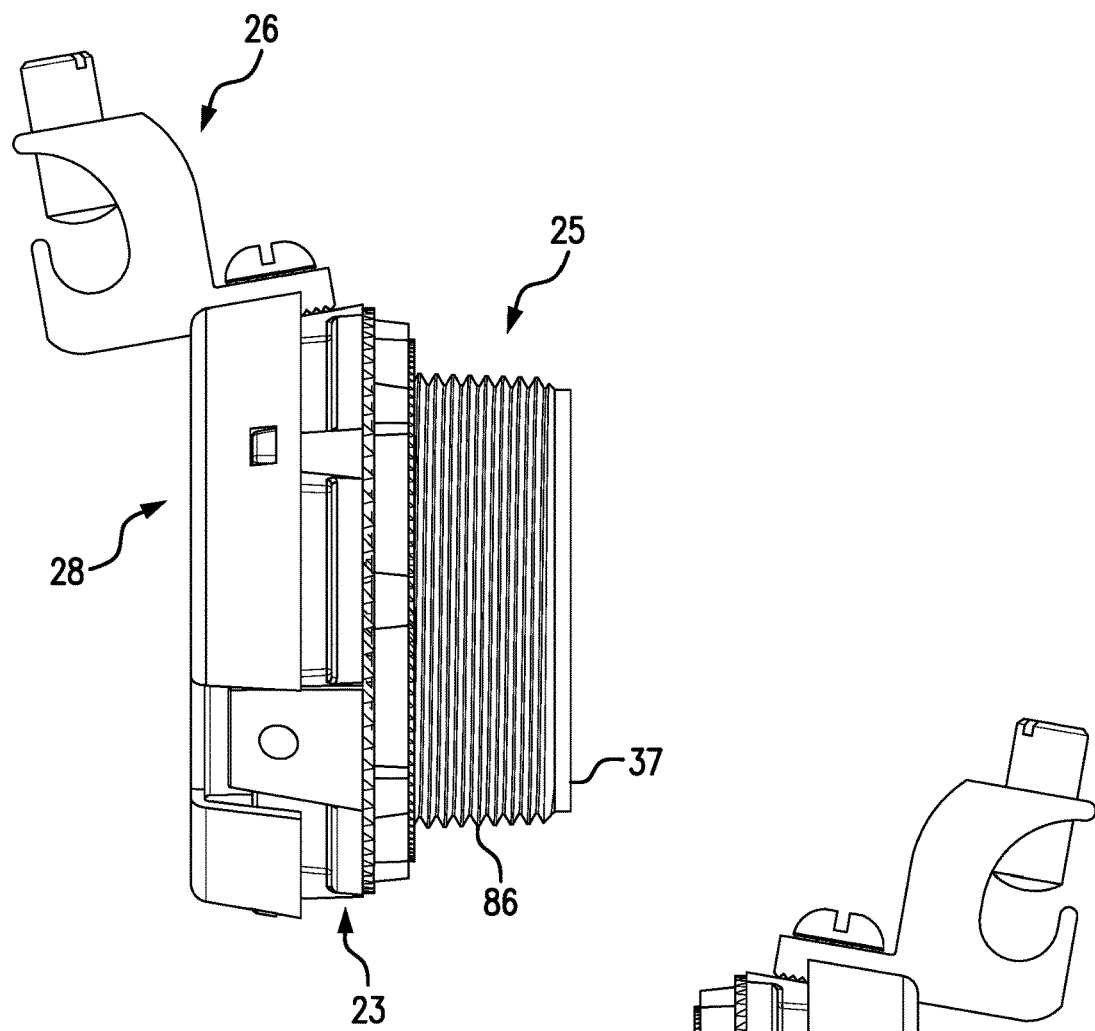
FIG. 3A is a side view of the grounding bushing taken from the right side relative to FIGS. 1 and 4.
Figure 3B:
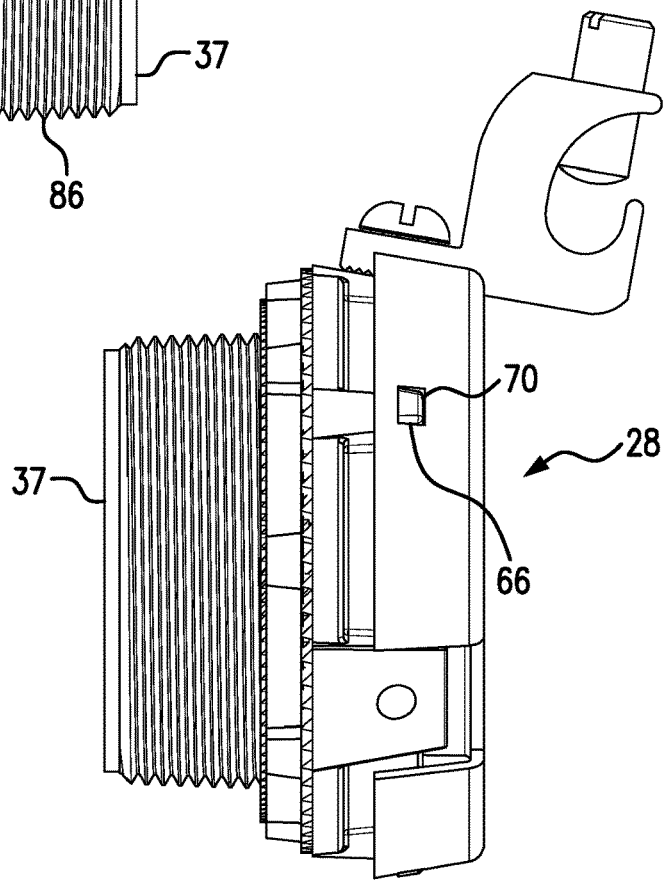
FIG. 3B is a left side view of the grounding bushing taken from the left side relative to FIGS. 1 and 4.
Figure 3C:
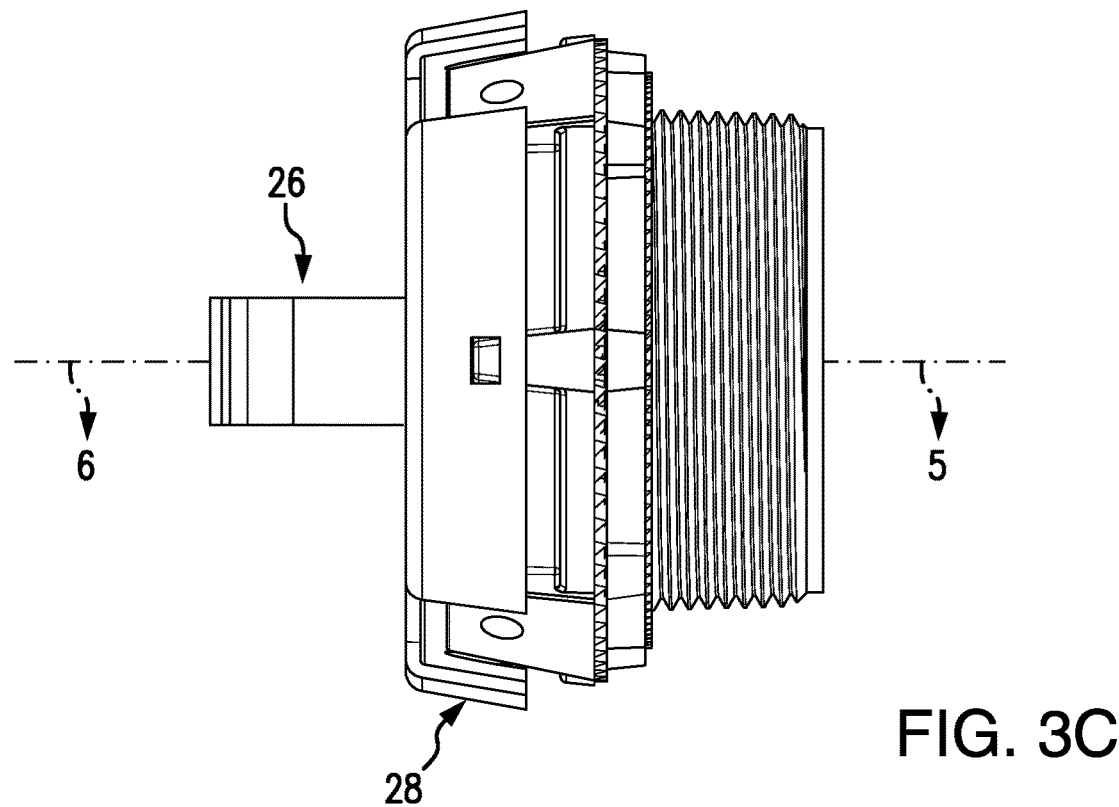
FIG. 3C is a bottom view of the grounding bushing taken relative to FIGS. 1 and 4.
Figure 3D:
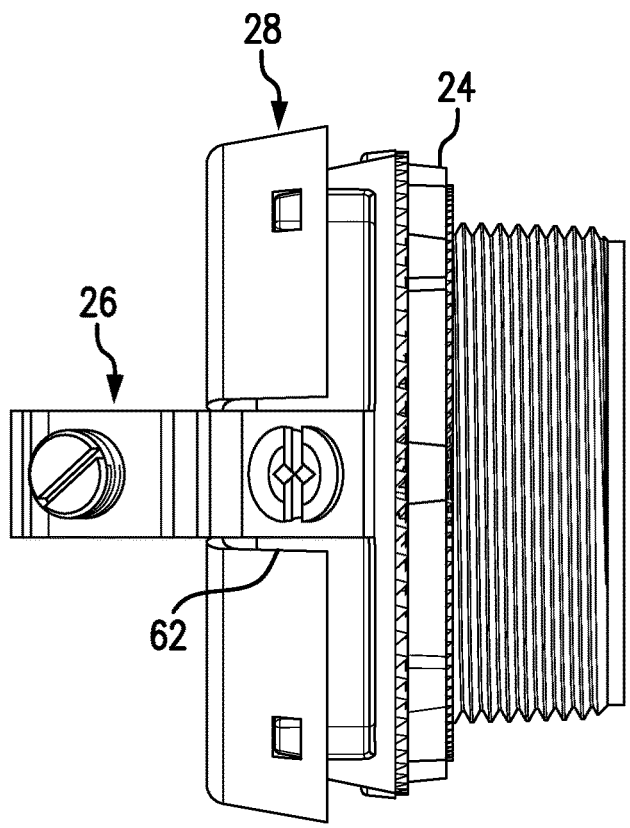
FIG. 3D is a top view of the grounding bushing taken relative to FIGS. 1 and 4.
Figure 4:
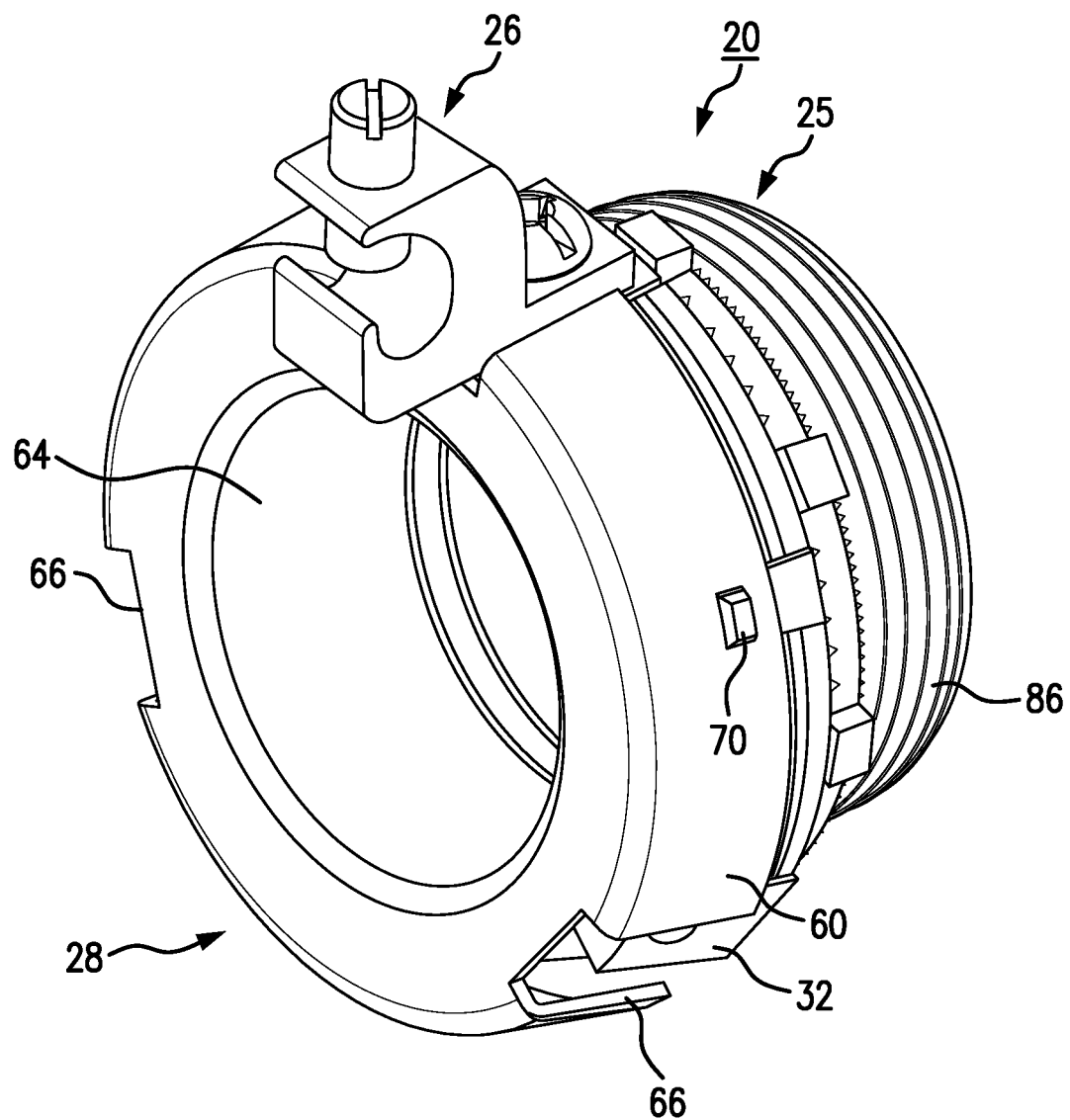
FIG. 4 is a perspective view of the grounding bushing shown in FIG. 1.

As seen in FIG. 1, a conduit nipple grounding bushing 20 in an embodiment of the present invention has a body 22 with a first end 39 and a second end 41, onto which a grounding lug 26 is threadably attached. The grounding bushing may include a locknut 24 for some applications as explained below. The grounding bushing may also include a snap-on insulator 28 and an insuliner 30 for use in some applications. The body 22 has a first portion 23 and a second portion 25, together forming a hollow cylindrical interior 35 therethrough for passage of electrical conductors 49 (see FIGS. 8-11). The body is typically manufactured from a zinc alloy. The first portion of the body includes a plurality of mounting pads 32 each having a threaded hole 34 for receipt of a mounting screw 36. Each mounting pad is configured for receipt of the grounding lug 26 by securing the grounding lug to the mounting pad via mounting screw 26 into threaded hole 34 passing through through-hole 38 in tab 40 of the grounding lug. The tab may include serrations 42 to mechanically and electrically bond the grounding lug to the mounting pad.

Figure 8:
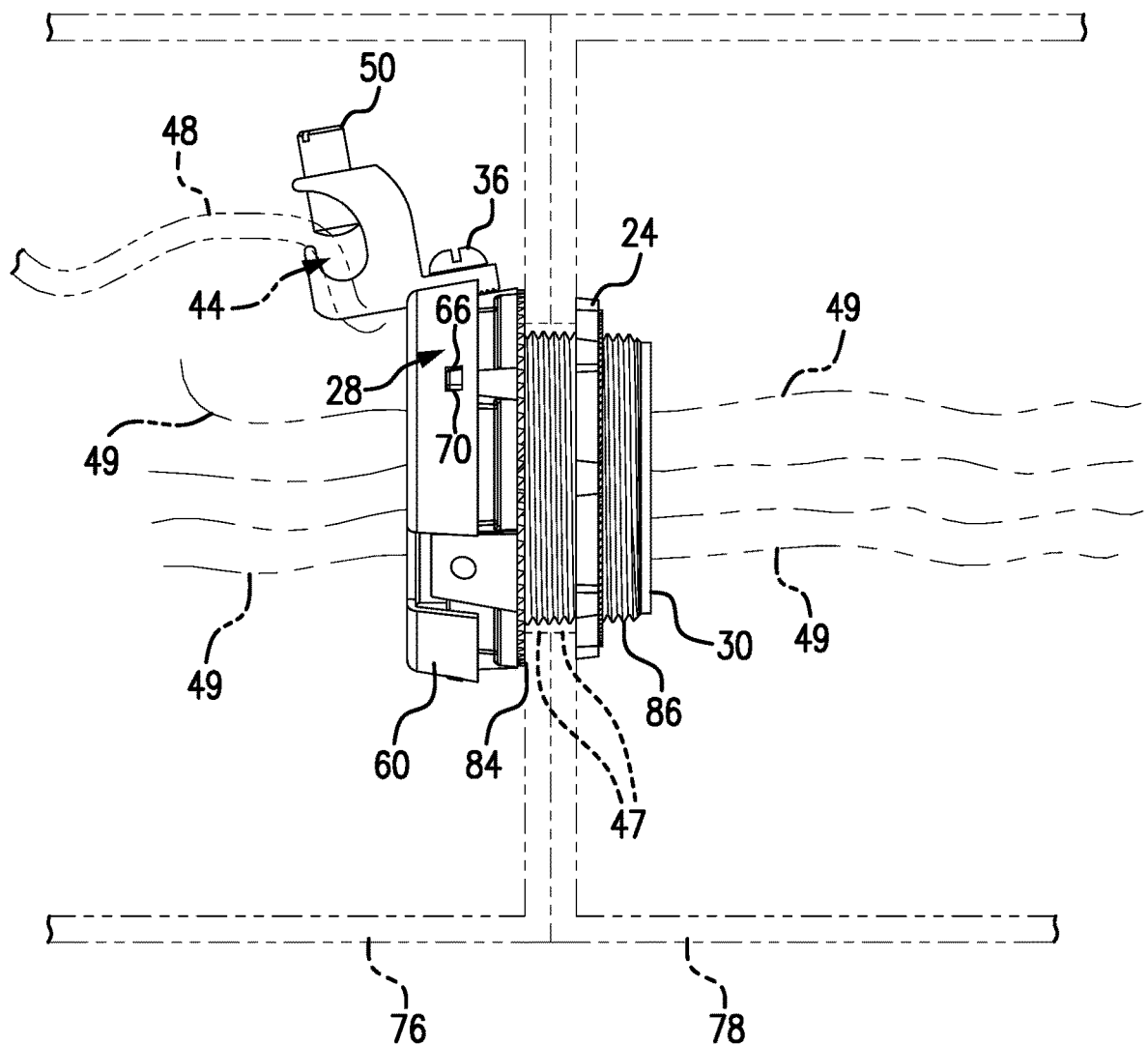
FIG. 8 is a side view of the conduit nipple grounding bushing showing its attachment to two electrical panel boxes or enclosures and diagrammatically showing the conductors passing through the grounding bushing as well as a grounding conductor attached to a grounding lug, the grounding bushing showing a snap-on insulator and an insuliner installed.
Figure 9:
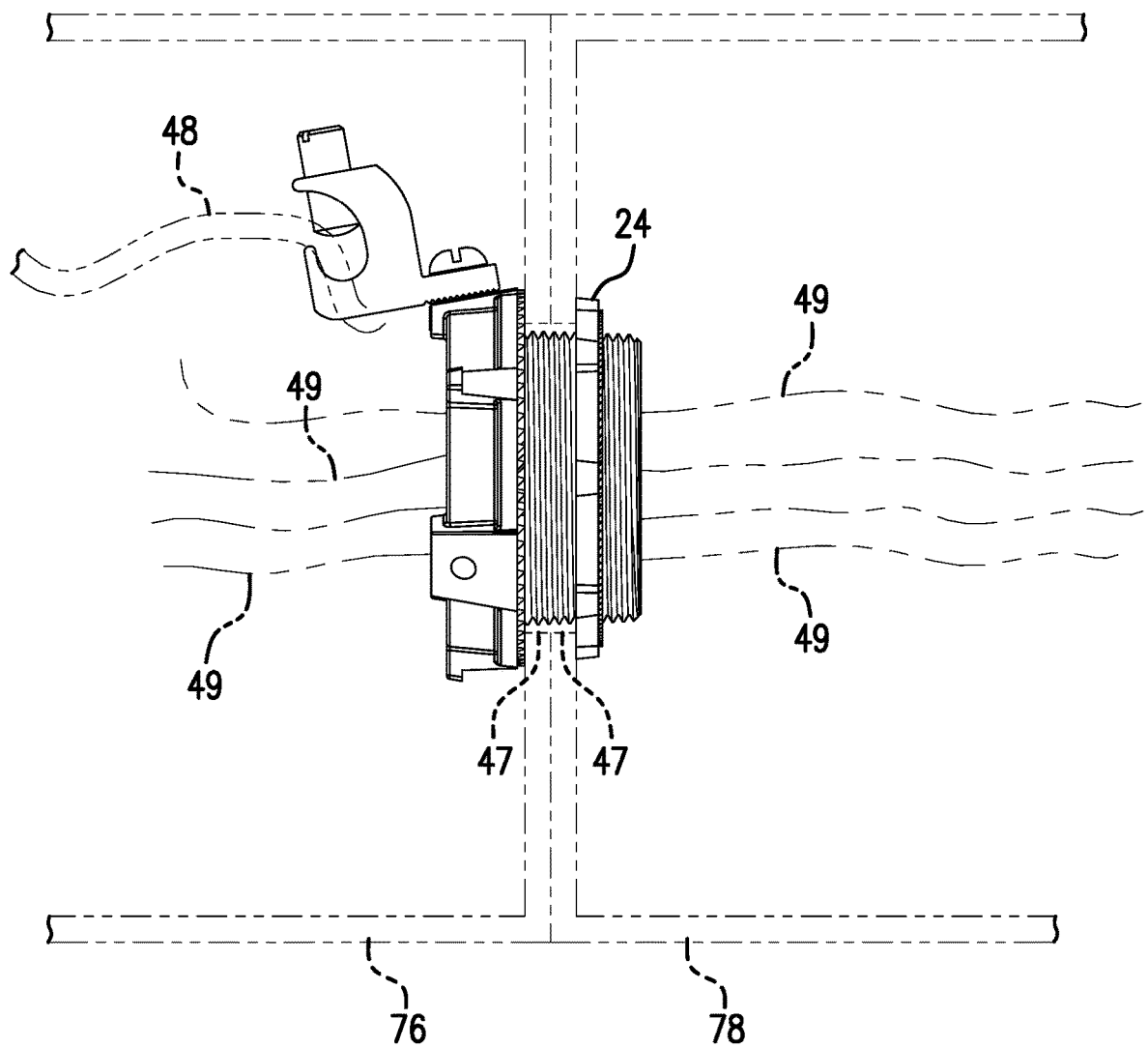
FIG. 9 is a side view of the grounding bushing similar to FIG. 8, showing the grounding bushing without attachment of the snap-on insulator and insuliner.
Figure 11:
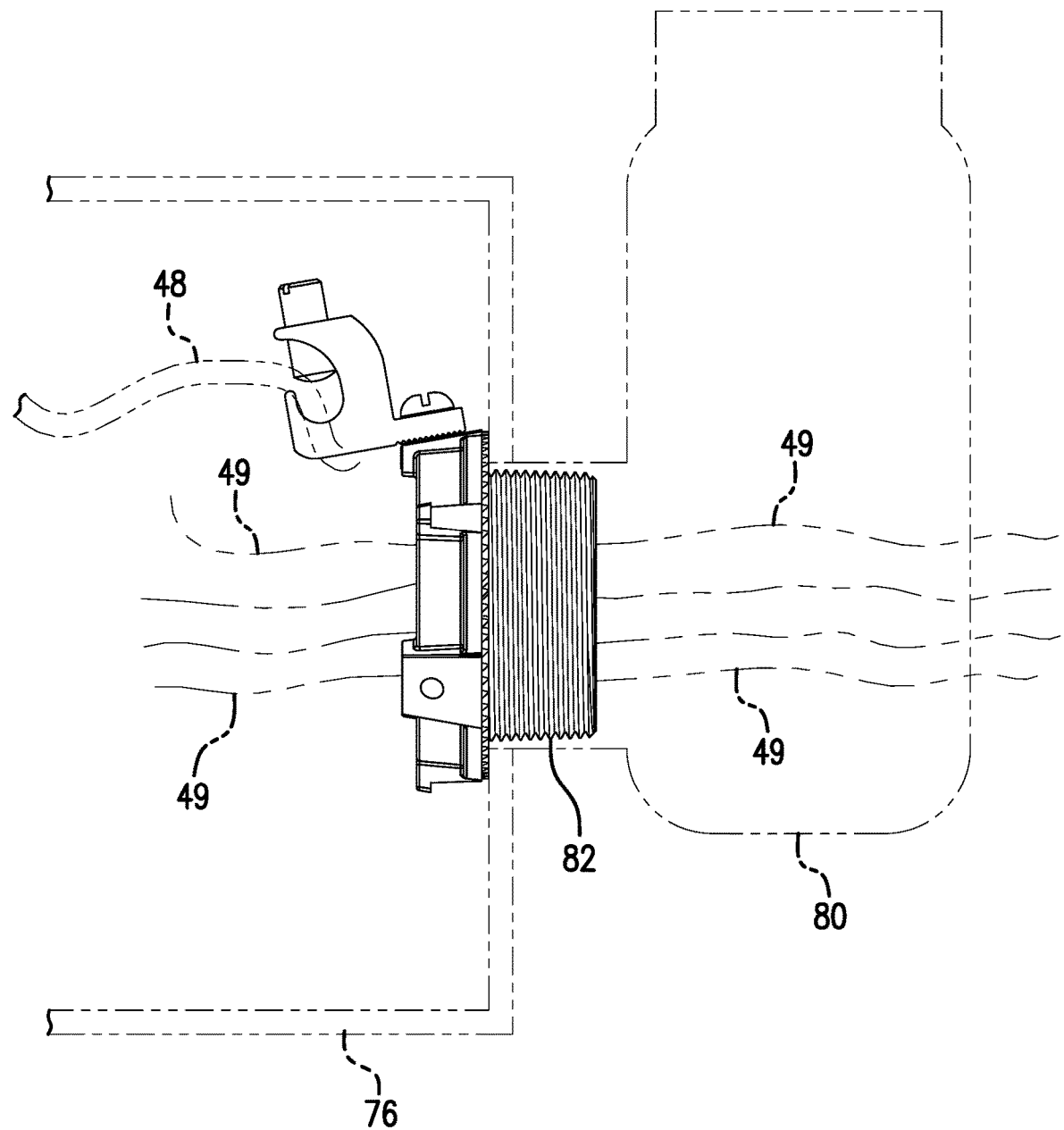
FIG. 11 is a side view of the grounding bushing similar to FIG. 10, but showing the grounding bushing without the snap-on insulator or insuliner.

The grounding lug includes a grounding wire clamp portion 44 that has an opening 46 for receipt of a grounding conductor 48 as seen in FIGS. 8, 9 and 11. A threaded stud or bolt 50 secures the grounding conductor 48 to the grounding wire clamp portion 44.

As seen in FIGS. 1-7, the conduit nipple grounding bushing may include a snap-on insulator 52 configured for a snap-on connection to body 22. The snap-on insulator has an end face 54 located on a first side of the snap-on insulator, the end face having an inner periphery 56 and an outer periphery 58. The snap-on insulator also has a substantially cylindrical member 60 joined to the outer periphery of the end face. The cylindrical member has one or more cutouts or slots 62, each cutout dimensioned to interfit with one of the mounting pads 32 of body 22.

The snap-on insulator also has a generally cylindrical sleeve 64 tapering and extending from the inner periphery 56 of the end face. As seen in FIGS. 1-7, the snap-on insulator is configured for snap-on connection to the body 22. The inner periphery 56 and generally cylindrical sleeve 64 provide a smooth surface through which conductors 48 can pass as seen in FIG. 8.

Figure 5:
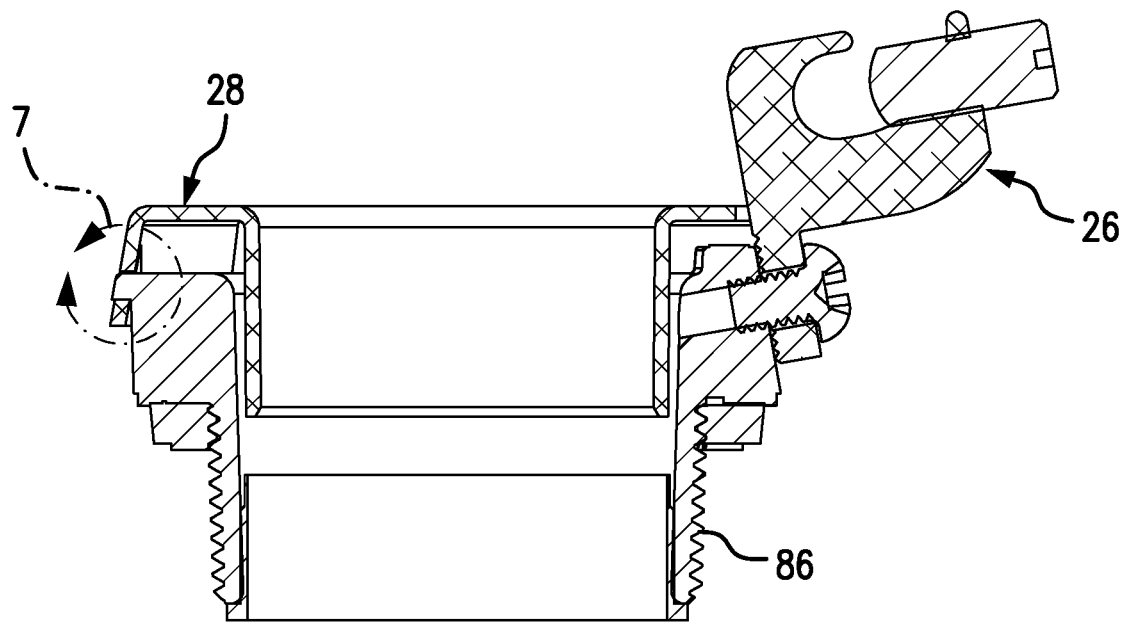
FIG. 5 is a cross-sectional view of the grounding bushing taken along line 5-5 of FIG. 3C.
Figure 7:
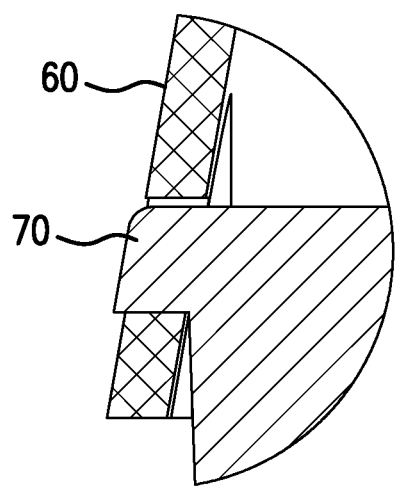
FIG. 7 is an enlarged cross-sectional view of the grounding bushing taken in the region identified by Circle 7 in FIG. 5.

Snap-on insulator 28 may further include openings 66, each opening dimensioned to receive a protrusion 70 extending radially outwardly from body 22 as best seen in FIGS. 1, 5 and 7. This arrangement helps secure the snap-on insulator to body 22.

Figure 10:
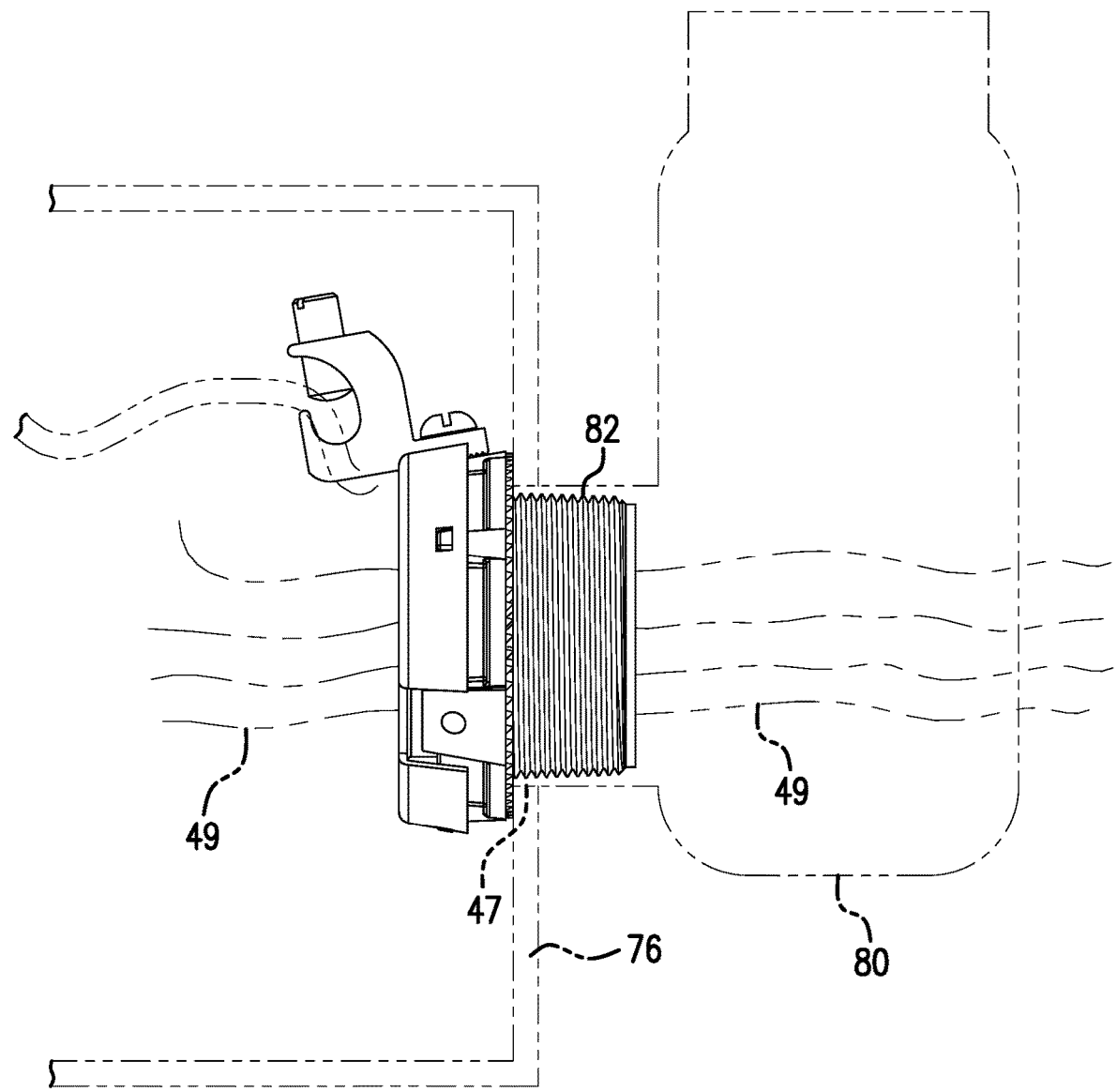
FIG. 10 is a side view of the grounding bushing attached to an electrical box and a threaded hub of a conduit body for passage of conductors through the electrical box into the conduit body and showing the snap-on insulator and insuliner installed through the grounding bushing.

The conduit nipple grounding bushing may also include an insuliner 30 which is dimensioned to press-fit into a second opening 74 of the second portion 25 of the body 22. Thus, the insuliner is configured for press-fitment into the second opening 74 at the second end 41 of the body at the second portion 25 as seen in FIGS. 8 and 10 where the conduit nipple grounding bushing is used to connect to electrical boxes 76 and 78 or to connect an electrical box 76 to a conduit body 80 having a threaded hub 82. With the insuliner installed in combination with the snap-on insulator, conductors 49 have smooth surfaces through which they pass relative to the conduit nipple grounding bushing. Insuliner 30 has a radially extending rim 37 that is dimensioned to contact the second end of the body in the second portion 25 thereof. This rim is further dimensioned to not interfere with securement of locknut 24 (See FIGS. 8 and 9) onto threads 86 on second portion 25 or threaded engagement of the conduit nipple grounding bushing to a conduit body 80 (See FIGS. 10 and 11).

As seen in FIGS. 1, 3, 4 and 6, body 22 thus has a first portion 23 with a first opening 27 and a second portion 25 within a second opening 74, both portions integrally connected to each other. The first portion has an end surface 31 that extends radially outward so as to contact electrical enclosure 76 about knockout hole 77 in the electrical enclosure. This end surface of the first portion 23 is adjacent second portion 25 of body 22. This end surface may include serrations 84 which reduce vibrations and facilitate electrical and mechanical bonding to enclosure 76. The conduit nipple grounding bushing is thus used to secure two electrical enclosures 76,78 as seen in FIGS. 8 and 9 through use of locknut 24, or when secured to one electrical enclosure and a conduit body 8 (see FIGS. 9 and 11), through use of threads 86 on the exterior of second portion 25.

FIG. 8 shows an embodiment where the grounding bushing may be positioned between two electrical boxes 76 and 78 through knockout holes 47 in each electrical box and where the grounding bushing includes snap-on insulator 28 and insuliner 72, with the grounding bushing secured by the locknut 24 threaded onto threads 86 of the grounding bushing. FIG. 9 shows an embodiment of the grounding bushing with locknut 24, but without the snap-on insulator or insuliner. FIG. 10 shows an embodiment where the threads 86 of the grounding bushing are threaded into a threaded hub 80 without the use of locknut 24. This embodiment shows use of the snap-on insulator and insuliner.

Similarly, FIG. 11 shows an embodiment where the conduit nipple grounding bushing is secured between electrical box 76 and conduit body 80 by threaded engagement of threads 86 of the grounding bushing to a threaded hub 82 of the conduit body 80, but without the snap-on insulator or insuliner.

The snap-on insulator is preferably fabricated from plastic such as polypropylene while the insuliner is also preferably fabricated from plastic such as polypropylene. The locknut is preferable fabricated from a zinc alloy. The grounding lug is preferable a plated aluminum grounding lug and the mounting screw 36 is preferably a zinc plated steel screw.

Thus, what has been described is a conduit nipple ground bushing which can be configured for securement between two electrical boxes or between an electrical box and a conduit body, wherein the conduit nipple grounding bushing can be secured by means of a locknut or if the conduit body has a threaded hub, to directly thread the conduit nipple grounding bushing to the conduit body via the threaded hub. In addition, the conduit nipple grounding bushing can utilize a snap-on insulator and an insuliner for providing smooth inner surfaces to the conduit nipple grounding bushing to minimize chaffing of conductors passing therethrough. In all configurations, the conduit nipple grounding bushing includes a grounding lug for providing electrical grounding of the conduit nipple grounding bushing and the associated enclosures or conduit body through which it passes, thereby insuring proper electrical grounding and bonding as required by applicable electrical codes.

What is claimed is:

1. A conduit nipple grounding bushing to connect between two electrical enclosures or an electrical enclosure and a conduit body, comprising:
   a body having a first portion and a second portion forming a hollow cylindrical interior for the passage of conductors therethrough, the body having a first opening at a first end of the body and a second opening at a second end of the body,
   the first portion having an outer surface with one or more mounting pads along a circumferential area, each of said one or more mounting pads configured for receipt of a grounding lug, and an end surface dimensioned to contact an electrical box about a knockout hole thereof, and
   wherein the second portion has exterior threads configured to pass through a knockout hole of an electrical box and dimensioned for receipt of a locknut if the conduit nipple grounding bushing is connected between two electrical boxes or for threaded engagement with a threaded hub of a conduit body if the conduit nipple grounding bushing is connected between an electrical box and a conduit body, and
   a grounding lug dimensioned for securement to one of the mounting pads by a screw, wherein the mounting pad includes a threaded bore for receipt of said screw, and
   further comprising a snap-on insulator, the snap-on insulator comprising:
   an end face located on a first side, the end face having an inner periphery and an outer periphery,
   a substantially cylindrical member joined to the outer periphery of the end face, the cylindrical member having one or more cutouts formed therein, each cutout dimensioned to be positioned adjacent with one mounting pad of the first portion of the body, a generally cylindrical sleeve extending from the inner periphery of the end face, the snap-on insulator thus configured to cover the first end of the body when connected thereto,
   wherein the first portion of the body has a plurality of protrusions spaced apart from the one or more mounting pads, said one or more protrusions extending radially, and wherein the snap-on insulator cylindrical member has openings formed therein configured to receive one of the protrusions of the first portion of the body, and
   further comprising an insuliner, cylindrical in shape and dimensioned for press-fit insertion into the second opening at the second end of the body.

2. The conduit nipple grounding bushing according to claim 1, wherein the insuliner has a radially extending rim at one end dimensioned to contact the second end of the body while not interfering with securement of a locknut to the exterior threads on the second portion of the body.

3. The conduit nipple grounding bushing according to claim 2, wherein the snap-on insulator and the insuliner are fabricated from plastic.

4. The conduit nipple grounding bushing according to claim 3, wherein the body is formed from zinc alloy.

5. A conduit nipple grounding bushing to connect between two electrical enclosures or an electrical enclosure and a conduit body, comprising: a body having a first portion and a second portion forming a hollow cylinder interior of or the passage of the conductors therethrough, the body having a first opening at a first end of the body and a second opening at a second end of the body, the first portion having an outer surface with one or more mounting pads along a circumferential area, each of said one or more mounting pads configured for receipt of a grounding lug, and an end surface dimensioned to contact an electrical box about a knockout hole thereof, and wherein the second portion has exterior threads configured to pass through a knockout hole of an electrical box and dimensioned for receipt of a locknut if the conduit nipple grounding bushing is connected between two electrical boxes or for threaded engagement with a threaded hub of a conduit body if the conduit nipple grounding bushing is connected between an electrical box and a conduit body, a grounding lug dimensioned for securement to one of the mounting pads by a screw, wherein the mounting pad includes a threaded bore for receipt of said screw, and further comprising a snap-on insulator, the snap-on insulator comprising: an end face located on a first side, the end face having an inner periphery and an outer periphery, a substantially cylindrical member joined to the outer periphery of the end face, the cylindrical member having one or more cutouts formed therein, each cutout dimensioned to be positioned adjacent with one mounting pad of the first potion of the body, a generally cylindrical sleeve extending from the inner periphery of the end face, the snap-on insulator thus configured to cover the first end of the body when connected thereto, and wherein the end surface of the first portion of the body includes serrations extending toward the second portion of the body so as to reduce vibrations between the conduit nipple grounding bushing and an electrical enclosure and to facilitate electrical and mechanical bonding to the electrical enclosure.

6. A conduit nipple grounding bushing to connect between two electrical enclosures or an electrical enclosure and a conduit body, comprising: a body having a first portion and a second portion forming a hollow cylinder interior of or the passage of the conductors therethrough, the body having a first opening at a first end of the body and a second opening at a second end of the body, the first portion having an outer surface with one or more mounting pads along a circumferential area, each of said one or more mounting pads configured for receipt of a grounding lug, and an end surface dimensioned to contact an electrical box about a knockout hole thereof, and wherein the second portion has exterior threads configured to pass through a knockout hole of an electrical box and dimensioned for receipt of a locknut if the conduit nipple grounding bushing is connected between two electrical boxes or for threaded engagement with a threaded hub of a conduit body if the conduit nipple grounding bushing is connected between an electrical box and a conduit body, a grounding lug dimensioned for securement to one of the mounting pads by a screw, wherein the mounting pad includes a threaded bore for receipt of said screw, and further comprising a snap-on insulator, the snap-on insulator comprising: an end face located on a first side, the end face having an inner periphery and an outer periphery, a substantially cylindrical member joined to the outer periphery of the end face, the cylindrical member having one or more cutouts formed therein, each cutout dimensioned to be positioned adjacent with one mounting pad of the first potion of the body, a generally cylindrical sleeve extending from the inner periphery of the end face, the snap-on insulator thus configured to cover the first end of the body when connected thereto, and further comprising an insuliner, cylindrical in shape and dimensioned for press-fit insertion into the second opening at the second end of the body.

7. The conduit nipple grounding bushing according to claim 6, wherein the insuliner has a radially extending rim at one end dimensioned to contact the second end of the body while not interfering with securement of a locknut to the exterior threads on the second portion of the body.

8. The conduit nipple grounding bushing according to claim 6, wherein the snap-on insulator and the insuliner are fabricated from plastic.

9. A conduit nipple grounding bushing to connect between two electrical enclosures or an electrical enclosure and a conduit body, comprising: a body having a first portion and a second portion forming a hollow cylinder interior of or the passage of the conductors therethrough, the body having a first opening at a first end of the body and a second opening at a second end of the body, the first portion having an outer surface with one or more mounting pads along a circumferential area, each of said one or more mounting pads configured for receipt of a grounding lug, and an end surface dimensioned to contact an electrical box about a knockout hole thereof, and wherein the second portion has exterior threads configured to pass through a knockout hole of an electrical box and dimensioned for receipt of a locknut if the conduit nipple grounding bushing is connected between two electrical boxes or for threaded engagement with a threaded hub of a conduit body if the conduit nipple grounding bushing is connected between an electrical box and a conduit body, a grounding lug dimensioned for securement to one of the mounting pads by a screw, wherein the mounting pad includes a threaded bore for receipt of said screw, and wherein the end surface of the first portion of the body includes serrations extending toward the second portion of the body so as to reduce vibrations between the conduit nipple grounding bushing and an electrical enclosure and to facilitate electrical and mechanical bonding to the electrical enclosure.

* * * * *